(12) United States Patent
Ryan

(10) Patent No.: US 6,205,996 B1
(45) Date of Patent: Mar. 27, 2001

(54) BARBECUE GRILL WITH RADIANT FIRE GRATE

(76) Inventor: John Patrick Ryan, 186 W. Mill Rd., Long Valley, NJ (US) 07853

( * ) Notice: Subject to any disclaimer, the term of this patent is extended or adjusted under 35 U.S.C. 154(b) by 0 days.

(21) Appl. No.: 09/613,381

(22) Filed: Jul. 11, 2000

Related U.S. Application Data

(63) Continuation-in-part of application No. 09/396,922, filed on Sep. 14, 1999.

(51) Int. Cl.[7] .............................. F24C 3/04; F24C 15/14
(52) U.S. Cl. .......................... 126/41 R; 99/341; 99/445; 126/39 K
(58) Field of Search ................ 126/41 R, 39 R, 126/39 J, 39 K, 390, 25 R; 99/444, 400, 401, 341, 447, 446, 445

(56) References Cited

U.S. PATENT DOCUMENTS

| | | | |
|---|---|---|---|
| 2,722,883 | 11/1955 | Rignell | 99/447 |
| 3,638,634 | 2/1972 | Bolitho | 126/41 R |
| 4,606,261 | 8/1986 | Bernardi | 99/445 |
| 4,724,823 | 2/1988 | Simpson | 126/39 R |
| 4,762,059 | 8/1988 | Mc Lane, Sr. | 99/445 |
| 4,878,477 | 11/1989 | McLane | 126/41 R |
| 4,979,440 | 12/1990 | Latour et al. | 99/445 |
| 5,121,738 | 6/1992 | Harris | 126/41 R |
| 5,163,358 | 11/1992 | Hanagan et al. | 99/339 |
| 5,165,385 | 11/1992 | Doolittle et al. | 126/25 R |
| 5,279,277 | 1/1994 | Barker | 126/41 R |
| 5,313,877 | 5/1994 | Holland | 99/446 |
| 5,355,558 | 10/1994 | Vertanen | 16/360 |
| 5,355,868 | 10/1994 | Haen | 126/41 R |
| 5,368,009 | 11/1994 | Jones | 126/41 R |
| 5,413,087 | 5/1995 | Jean | 126/41 R |
| 5,546,853 | 8/1996 | Heil et al. | 99/447 |
| 5,582,094 | 12/1996 | Peterson et al. | 99/445 |
| 5,615,666 | 4/1997 | Ransom | 126/25 R |
| 5,617,778 | 4/1997 | Schroeter et al. | 99/446 |
| 5,638,808 | 6/1997 | Home | 126/41 R |
| 5,761,990 | 6/1998 | Stewart et al. | 99/401 |
| 5,782,166 | 7/1998 | Lin | 99/340 |
| 5,878,739 | 3/1999 | Guidry | 126/25 R |
| 5,960,784 | 10/1999 | Ryan | 126/41 R |

*Primary Examiner*—Ira S. Lazarus
*Assistant Examiner*—Sara Clarke

(57) ABSTRACT

A barbecue grill includes a fire grate to allow cooking by radiant heat only, having no holes large enough for convection flow. The grate is one piece of heat resistant steel for economy, and to vaporize grease. Peripheral flanges catch grease drips. The flanges direct convection of hot gases along the housing inside surface to vaporize grease. A small hole is for visual confirmation of flame ignition. The grate has ridges and valleys to distribute heat evenly and to radiate heat to the food from several directions. A divider wall separates the grate into two heat zones. Used with one burner of a dual-burner grill, the wall confines the hot gases and radiant energy to half of the grate to conserve fuel.

20 Claims, 4 Drawing Sheets

BARBECUE GRILL WITH RADIANT FIRE GRATE

CROSS REFERENCES TO RELATED APPLICATIONS

This application is a continuation-in-part of a previous, pending application assigned Ser. No. 09/396,922, filed in the United States Patent and Trademark Office on Sep. 14, 1999 by John Patrick Ryan, and titled "Radiant Fire Grate And Drip Vaporizer."

FIELD OF THE INVENTION

This invention relates generally to the field of barbecue grills, and pertains, more specifically, to a fire grate for grills to allow cooking by radiant heat, to vaporize grease that drips onto the grate, and to provide separate heating zones to conserve fuel.

BACKGROUND OF THE INVENTION

Barbecue grills are in popular use for outdoor home cooking and for commercial use. Many grills today use a metal grate interposed between the burner and the cooking surface to replace charcoal or stones, to heat food more evenly, and to vaporize grease drippings. Some examples of grills in the prior art are seen in the following U.S. patents:

Barker, U.S. Pat. No. 5,279,277, shows a curved, one-piece grate. No holes are provided for convection through the grate. The food cooks by heat radiated from the grate. Grease drips upon the grate and is vaporized. Minimal venting is provided for the escape of combustion gases.

Holland, U.S. Pat. No. 5,313,877, illustrates a one-piece grate with no holes in the grate. Holes are located in the housing around the periphery of the grate, to provide convection flow of hot gases to the space above the food. The grate includes a trough and drain pipe to drain grease to an external container.

McLane, U.S. Pat. No. 4,878,477, and Peterson, U.S. Pat. No. 5,582,094, both disclose a corrugated cooking surface with multiple holes for convection flow, and to drain grease to a collection point.

McLane, Sr., U.S. Pat. No. 4,762,059, shows multiple-piece V-shaped grate members for collecting grease drippings and evaporating them. Large holes are provided for convection flow.

Harris, U.S. Pat. No. 5,121,738, discloses a grate formed of a plurality of ceramic briquettes configured to catch and vaporize grease. Space is provided around the periphery of the grate for convection flow of hot gases.

Doolittle, U.S. Pat. No. 5,165,385, illustrates a conventional multiple rod grid type of grate for supporting charcoal or stone briquettes. Large holes allow generous convection flow.

While the above-described grills are functional for cooking food, they all display shortcomings inherent in their design. Grates made of stainless steel, or other non-heat resistant materials will burn out quickly from the heat of the flame. Grills with large holes in or surrounding the grate allow hot combustion gases to flow by convection through the grate. The hot gases are intended to cook the food. However, there is evidence that products of combustion, when introduced to food during cooking, may form carcinogens on the food. A one-piece fire grate would prevent convection flow of gases through the grate and around the food. Furthermore, as the gases flow out of the combustion space, cold ambient air flows into the space to displace the exiting gases. The cold air cools the system, resulting in long heat-up times and cooler cooking temperatures. Flowing gases tend to form eddy currents in pockets and corners of the combustion space, causing uneven temperature distribution on the grate, and consequent uneven cooking of the food. The curved grate of Barker, for example, will exhibit different temperatures at the edges than at the center. The flat or curved grates radiate heat substantially in one direction, upward. A corrugated grate, having ridges and valleys, will distribute heat more evenly over the grill area than a flat or curved grate. A corrugated grate will also radiate heat sideways as well as upward, to cook the food from the side as well as from below. Multiple-piece grates are expensive to fabricate and difficult to clean. A one-piece grate such as that of Barker has no hole for visual confirmation of flame ignition, leading to a dangerous situation in which unignited gas can collect in the combustion space. Provision should be made to operate the grill with charcoal briquettes or without briquettes, as desired. None of the prior art grills provide this option. Grates that drain grease to an external collection point are messy and are subject to fires in the drainage system, and congealing of grease when the system cools down. Grills equipped with two or more burners can be used with one burner for economy. However, some means, such as a wall, must be provided for confining the heat to that part of the grate which is in use. None of the above-described grills have this provision.

Accordingly, there is a need to provide a barbecue grill having a heat-resistant metal fire grate to vaporize grease for a cleaner barbecue, without burning out the grate;

there is another need to provide a barbecue grill fire grate of the type described, and having one-piece construction for simplicity and economy;

there is yet another need to provide a barbecue grill fire grate of the type described, and having no holes large enough for any significant convection current flow through the grate, so that the food will cook by radiant heat only, excessive cold air flow will not cool the grill, and products of combustion will not form carcinogens on the food;

there is a still another need to provide a barbecue grill fire grate of the type described, and having a small hole for visual confirmation of flame ignition;

there is a further need to provide a barbecue grill fire grate of the type described, and having a corrugated shape to distribute heat evenly and to radiate heat to the food from several different directions;

there is a still further need to provide a barbecue grill fire grate of the type described, and having a divider wall for use with one burner to conserve fuel;

there is a yet further need to provide a barbecue grill fire grate of the type described, and that provides the option of cooking with or without charcoal briquettes; and there is an additional need to provide a barbecue grill fire grate of the type described, and that can be manufactured economically in large quantities of high quality, and that will have a long service life.

SUMMARY OF THE INVENTION

The above features, as well as further features and advantages, are attained by the present invention which may be described briefly as a barbecue grill comprising a housing having an upright housing periphery wall with an inside surface, and a burner disposed within the housing. A generally horizontal cooking grate is disposed within the housing and above the burner. The barbecue grill includes a fire grate having a plate interposed between the burner and the cooking grate, wherein grease will drip upon the plate and vaporize. The plate has a viewing hole juxtaposed in visual alignment with the burner for visual confirmation of flame ignition. The viewing hole is of a predetermined size so as to preclude convection flow sufficient to cook food, whereby the food will cook by radiant heat only.

BRIEF DESCRIPTION OF THE DRAWING

The invention will be more fully understood, while still further features and advantages will become apparent in the following detailed description of preferred embodiments thereof illustrated in the accompanying drawing, in which.

DESCRIPTION OF THE PREFERRED EMBODIMENTS

Figure 1:
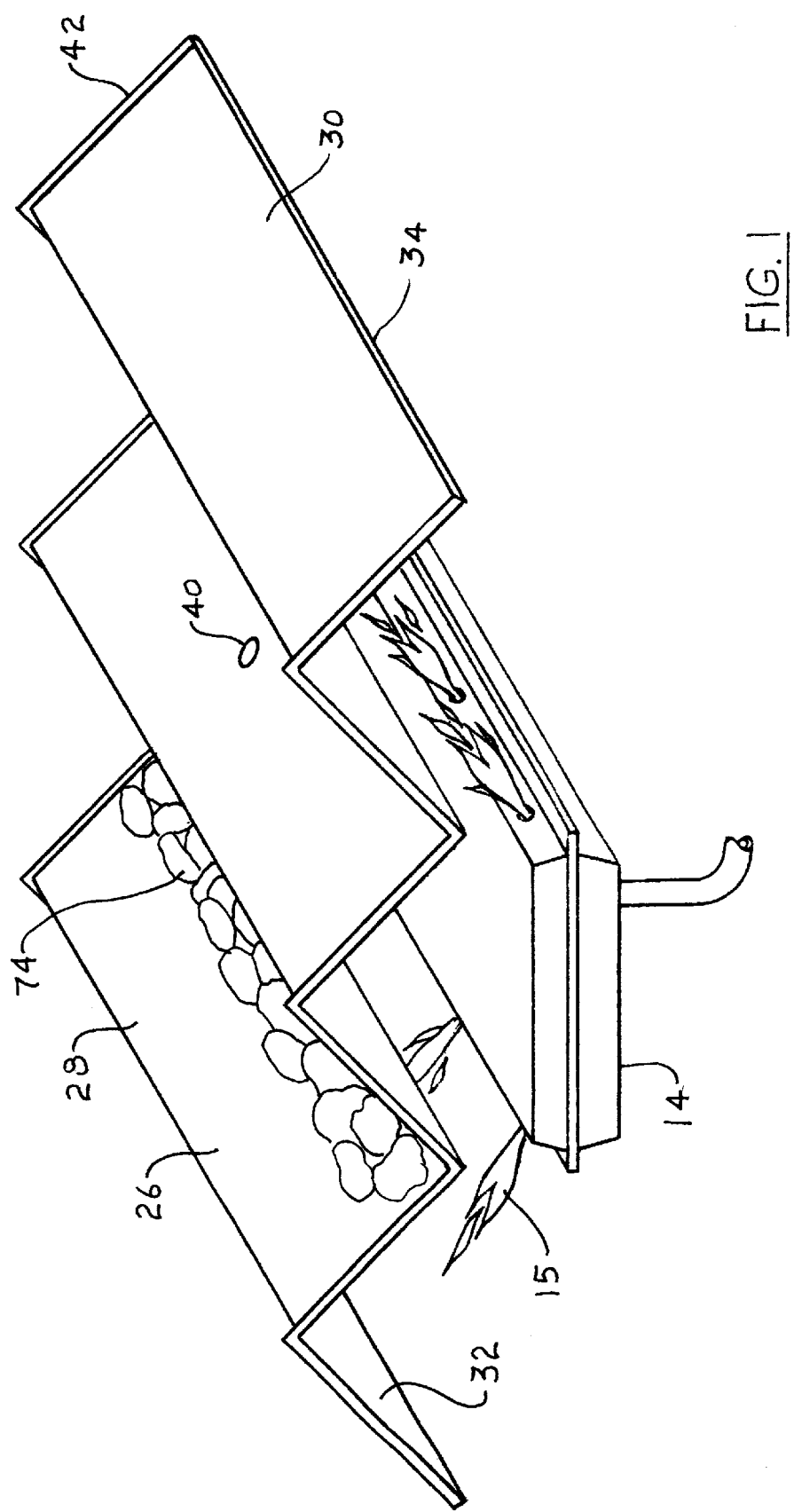
FIG. 1 is an isometric view of a radiant fire grate constructed in accordance with the invention.
Figure 2:
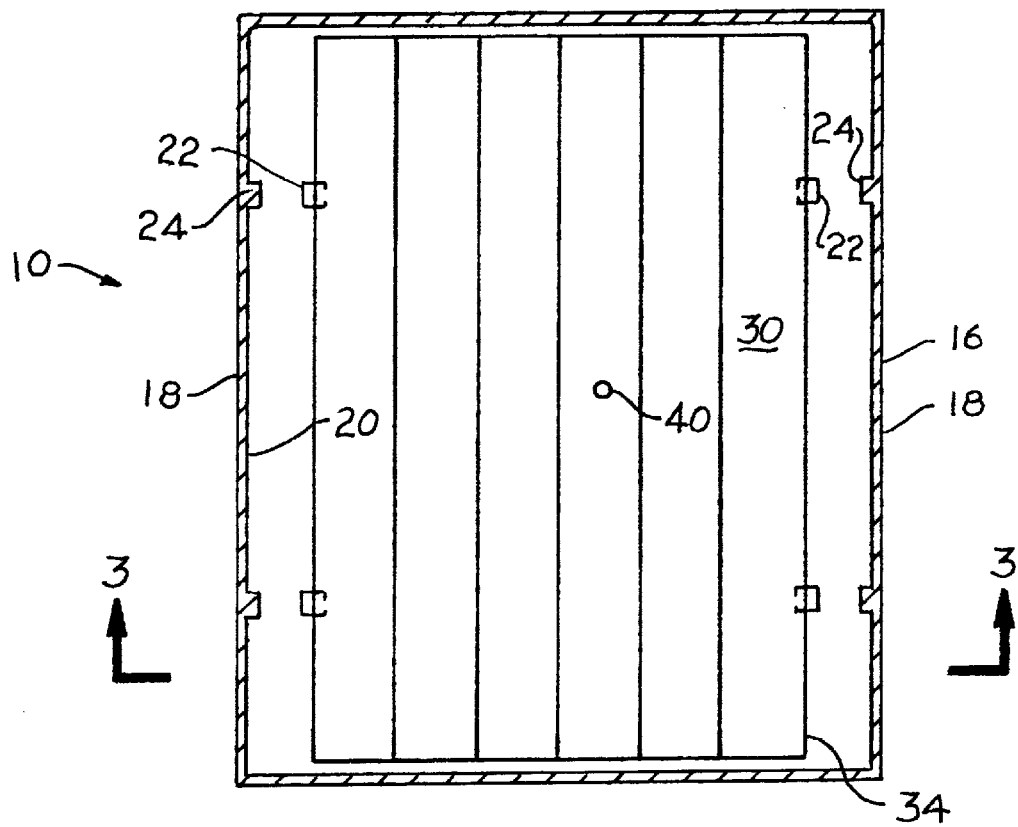
FIG. 2 is a cross-sectional plan view of a barbecue grill having the radiant fire grate of FIG. 1, taken along lines 2—2 of FIG. 3.
Figure 3:
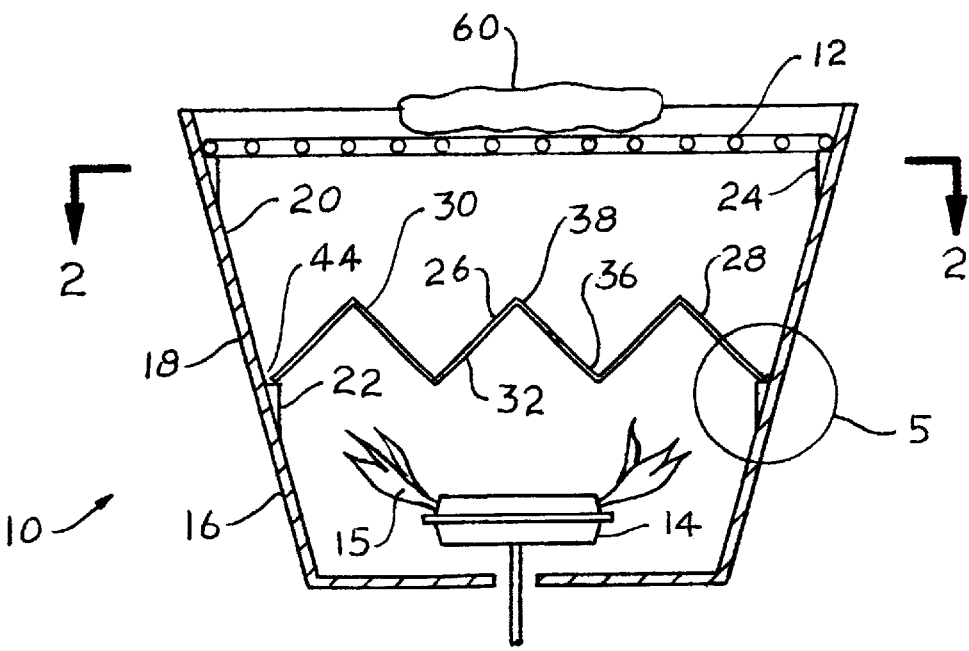
FIG. 3 is a cross-sectional side elevational view of the barbecue grill of FIG. 2, taken along lines 3—3 of FIG. 2.

Referring now to the drawing, and especially to FIGS. 1,2 and 3 thereof, a barbecue grill is shown at 10. The grill has a housing 16, and a burner 14 disposed within the housing 16. Flames are indicated at 15. A generally horizontal cooking grate 12 is disposed within the housing 16 and above the burner 14. The housing 16 has an upright housing periphery wall 18 with an inside surface 20.

The barbecue grill 10 includes a fire grate 26, which comprises a plate 28, made from a material such as heat-resistant steel, interposed between the burner 14 and the cooking grate 12 so that grease will drip upon the plate 28 and vaporize. The housing 16 has upper supports 24 for the cooking grate 12, and lower supports 22 for the fire grate 26. The plate has upper 30 and lower 32 surfaces, and a periphery 34.

Figure 5:
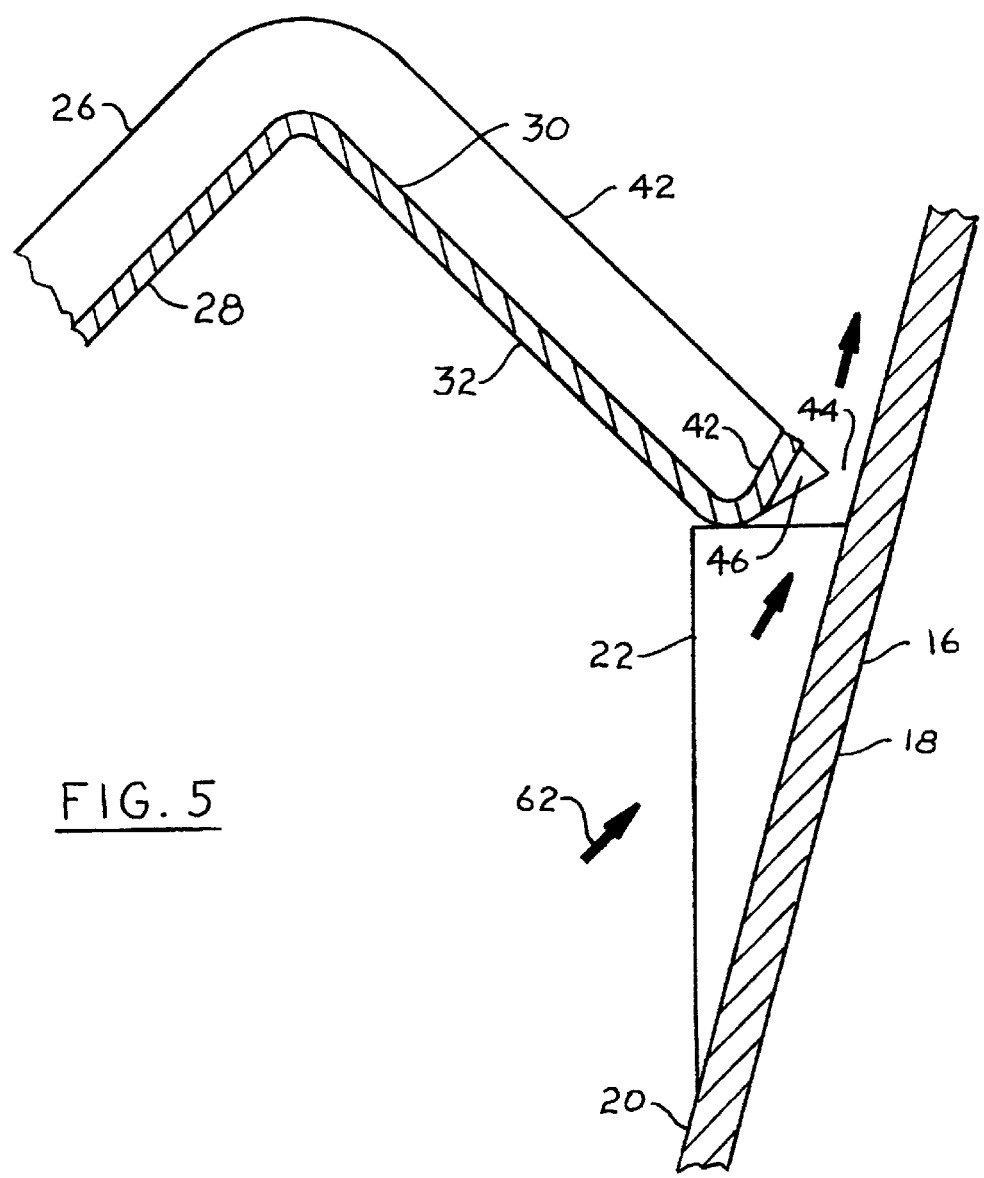
FIG. 5 is an enlarged view of detail 5 of FIG. 3.
Figure 7:
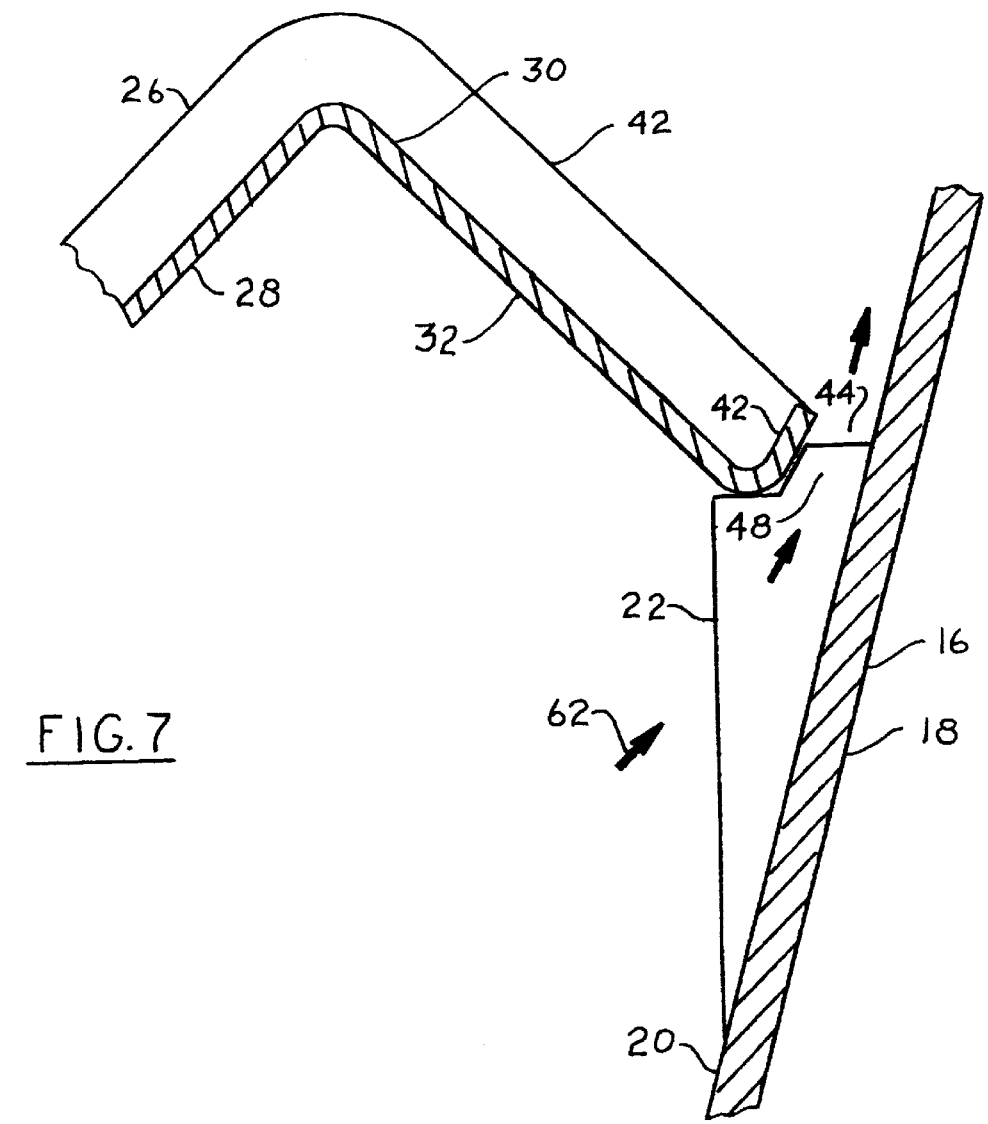
FIG. 7 is another enlarged view of detail 5 of FIG. 3, showing a further embodiment of the invention.

The plate 28 is configured with a plurality of alternating valleys 36 and ridges 38 for radiating heat sideways as well as upward so as to more thoroughly cook food 60. The valleys 36 are able to hold charcoal briquettes 74 as an optional cooking method. The burner 14 will heat the plate 28 which will, in turn, heat and ignite the briquettes 74. The burner 14 will then be turned off, and the food cooked by radiant heat from the briquettes 74 radiating directly upward, as well as reflecting sideways from the valleys 36 and ridges 38. The periphery 34 and the housing wall inside surface 20 include a vent space 44 therebetween of a predetermined size. The predetermined size is just sufficiently large to allow convection flow of hot combustion gases upward along the housing wall inside surface 20, as shown by arrows 62 in FIGS. 5 and 7. The predetermined size can vary from a lower limit of approximately ⅛ inch (3 mm) to an upper limit of approximately 1 inch (25 mm). An optimum size vent space 44 is approximately ¼ inch (6 mm). A vent space 44 of less than ⅛ inch (3 mm) may become clogged with debris. A vent space 44 of more than 1 inch (25 mm) will allow an excessively high flow rate of combustion gases, resulting in a concomitantly high flow rate of cool inlet air, which will increase warm up time significantly. The plate 28 further comprises a flange 42 extending generally around the periphery 34 and projecting upward therefrom, so as to direct the flow of hot combustion gases upward along the housing wall inside surface 20. The hot gases will vaporize grease off the housing wall inside surface 20, keeping the grill clean. Spacing means is provided for establishing and maintaining the vent space 44. Specifically, the spacing means comprises a plurality of spacers interposed between the plate periphery 34 and the grill housing 16. Elements 46, extensions of the fire grate 26, are one embodiment of the spacing means. Elements 48, attached to the lower supports 22, are another embodiment of the spacers.

The plate 28 has a viewing hole 40, of a predetermined size, juxtaposed in visual alignment with the burner 14 for visual confirmation of flame ignition. The viewing hole 40 also allows the burner 14 to be ignited with a match in the event that the electric igniter fails. The viewing hole 40 is small enough to preclude convection flow sufficient to cook the food. The food 60 is thus cooked by radiant heat only. The size of the viewing hole 40 can vary from a lower limit of approximately ⅛ inch (3 mm) across, to an upper limit of approximately 1 inch (25 mm) across at it's narrowest point. An optimum size viewing hole 40 is approximately ¼ inch (6 mm) across. A viewing hole 40 of less than ⅛ inch (3 mm) may become clogged with grease, dirt, and carbon. A viewing hole 40 of more than 1 inch (25 mm) will allow convection flow sufficient to cook the food that is directly over the viewing hole 40. Such a large hole will also subject the food to carcinogenic products of combustion. The viewing hole 40 may be circular or non-circular in shape.

Figure 4:
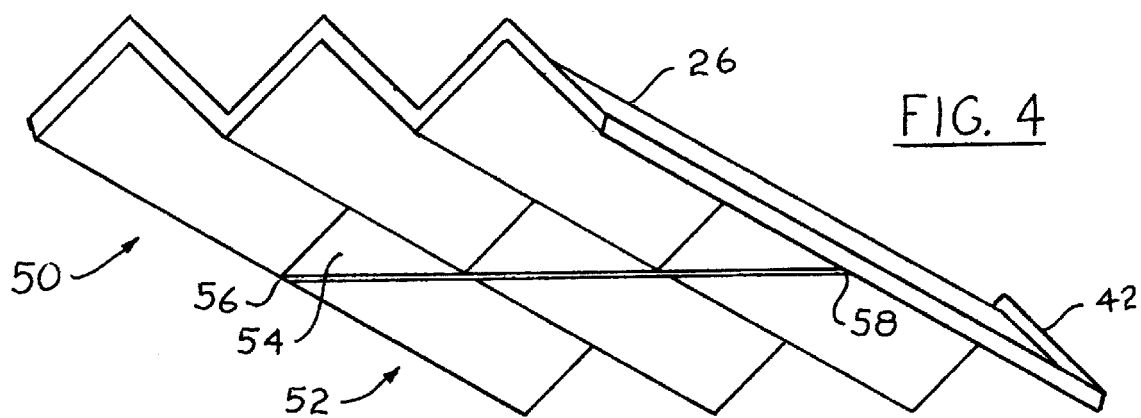
FIG. 4 is an isometric view of another radiant fire grate constructed in accordance with the invention, showing the underside of the grate.

Turning now to FIG. 4, another embodiment of the fire grate plate 28 includes a divider wall 54 attached to the plate lower surface 32 and extending downward therefrom. The divider wall 54 divides the plate 28 into two heating zones, a first zone 50 and a second zone 52. The divider wall 54 extends from a first point 56 closely adjacent to the plate periphery 34 across the plate 28 to a generally opposite second point 58 closely adjacent to the plate periphery 34. The divider wall 54 is for use with one burner of a dual or multiple burner grill to confine the hot combustion gases and radiant energy of the one burner to substantially one zone, and thereby conserve fuel. This is economical when cooking for only one or two people.

Figure 6:
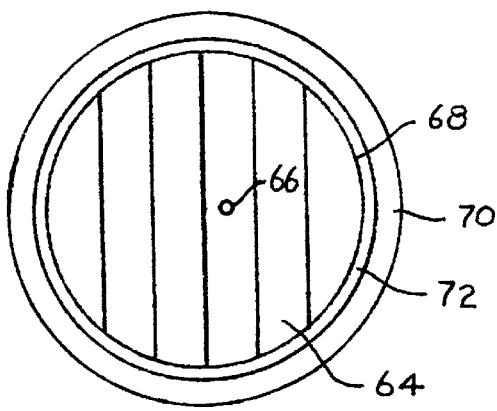
FIG. 6 is a plan view of another barbecue grill having a circular radiant fire grate constructed in accordance with the invention.

The fire grate plate can assume any number of shapes. FIG. 6 shows another embodiment of the invention having a generally circular fire grate plate 64, with a viewing hole 66, and a plate periphery 68. A circular housing 70 is separated from the plate 64 by a vent space 72.

Carrying out the invention comprises the steps of: interposing a fire grate 26, having a plate 28, between the burner 14 and the cooking grate 12, wherein grease from food will drip upon the fire grate 26; heating the plate 28 with the burner 14, thereby vaporizing the grease from the plate 28; forming a plurality of alternating valleys 36 and ridges 38 in the plate 28; radiating heat sideways as well as upward from the valleys 36 and ridges 38, thereby cooking the food thoroughly; viewing the flame through a viewing hole 40 in the plate 28 to confirm ignition; cooking the food by radiant heat only; limiting convection flow through the viewing hole 40 in the plate 28 to a flow insufficient to cook the food, whereby the food will be cooked by radiant heat only; and limiting the viewing hole 40 to a predetermined size small enough to limit convection flow through the plate 28.

Further steps comprise: convecting hot combustion gases upward through a vent space 44 between the plate periphery 34 and the housing wall inside surface 20; vaporizing the grease off the housing wall inside surface 20 with the hot combustion gases; and establishing and maintaining the vent space 44 by interposing a plurality of spacers 46 and 48 between the plate periphery 34 and the housing wall inside surface 20.

Yet further steps are: forming the plate periphery 34 upward into a flange 42; and directing the hot combustion gases along the housing wall inside surface 20 by the flange 42, thereby vaporizing the grease from the housing wall inside surface 20.

Still further steps include: dividing the plate 28 into two opposite heating zones by attaching a divider wall 54 to the plate lower surface 32; extending the divider wall 54 from closely adjacent a peripheral first point 56 on the plate 28, across the plate 28 to closely adjacent a generally opposite peripheral second point 58 on the plate 28; using one burner of a dual burner grill to heat one zone only, thereby conserving fuel; and confining the hot combustion gases and radiant energy of the one burner to substantially one zone, by using the divider wall 54 to substantially block heat flow to the opposite zone.

As seen from the foregoing description, the present invention satisfies the need to provide a barbecue grill having a heat-resistant metal fire grate to vaporize grease for a cleaner barbecue, without burning out the grate; having one-piece construction for simplicity and economy; having a no holes large enough for any significant convection current flow through the grate, so that the food will cook by radiant heat only, excessive cold air flow will not cool the grill, and products of combustion will not form carcinogens on the food; having a small hole for visual confirmation of flame ignition; having a corrugated shape to distribute heat evenly and to radiate heat to the food from several different directions; and having a divider wall for use with one burner to conserve fuel.

Although the invention has been described and illustrated in the preferred embodiments, those skilled in the art will make changes that will be seen to be functional equivalents to the present invention. For example, the preferred embodiment is rectangular in plan view. It will be appreciated that the grate could be made square, round, oval, or another shape and still fall within the scope of the claims. Furthermore, the preferred embodiment has a round viewing hole. It will be appreciated that the viewing hole may be a rectangular or oval slot, or any shape and still fall within the scope of the claims. It is therefore to be understood that the above detailed description of embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. A barbecue grill comprising:
   (a) a housing, the housing having an upright housing periphery wall with an inside surface;
   (b) a burner disposed within the housing;
   (c) a generally horizontal cooking grate disposed within the housing and above the burner; and
   (d) a fire grate having a plate interposed between the burner and the cooking grate wherein grease will drip upon the plate and vaporize, the plate having a viewing hole juxtaposed in visual alignment with the burner for visual confirmation of flame ignition, the viewing hole being of a predetermined size so as to preclude convection flow sufficient to cook food, whereby the food will cook by radiant heat only.

2. The barbecue grill of claim 1, wherein the predetermined size of the fire grate viewing hole falls within a range of from approximately ⅛ inch (3 mm) across, to approximately 1 inch (25 mm) across.

3. The barbecue grill of claim 1, wherein:
   (a) the fire grate plate includes upper and lower surfaces, a periphery, and a plurality of alternating valleys and ridges for radiating heat sideways as well as upward so as to thoroughly cook the food;
   (b) the fire grate plate periphery and the fire grate housing wall inside surface include a vent space therebetween of a predetermined size so as to allow convection flow of hot combustion gases upward along the housing wall inside surface to vaporize grease off the housing wall inside surface; and
   (c) the fire grate further comprises spacing means for establishing and maintaining the vent space.

4. The barbecue grill of claim 3, wherein the predetermined size of the vent space falls within a range of from approximately ⅛ inch (3 mm) to approximately 1 inch (25 mm).

5. The barbecue grill of claim 3, wherein the spacing means further comprises a plurality of spacers interposed between the plate periphery and the grill housing.

6. The barbecue grill of claim 3, wherein the plate further comprises a flange extending generally around the plate periphery and projecting upward therefrom, so as to direct the flow of hot combustion gases upward along the housing wall inside surface.

7. The barbecue grill of claim 3, further comprising a divider wall attached to the fire grate plate lower surface and extending downward therefrom for dividing the plate into two heating zones, the divider wall extending from a first point closely adjacent to the plate periphery across the plate to a generally opposite second point closely adjacent to the plate periphery, for use with one burner of a dual burner grill, so as to confine the hot combustion gases and radiant energy of the one burner to substantially one zone, and thereby conserve fuel.

8. The barbecue grill of claim 1, wherein the fire grate plate is generally circular in plan.

9. The barbecue grill of claim 1, wherein the fire grate plate is generally rectangular in plan.

10. A barbecue grill comprising:
   (a) a housing, the housing having an upright housing periphery wall with an inside surface;
   (b) a burner disposed within the housing;
   (c) a generally horizontal cooking grate disposed within the housing and above the burner; and
   (d) a fire grate having a plate interposed between the burner and the cooking grate so that grease will drip upon the plate and vaporize, the plate having upper and lower surfaces, the plate having a periphery, the plate periphery and the housing wall inside surface including a vent space therebetween of a predetermined size so as to allow convection flow of hot combustion gases upward along the housing wall inside surface to vaporize grease off the housing wall inside surface, the plate having a plurality of alternating valleys and ridges for radiating heat sideways as well as upward so as to thoroughly cook food, the plate having a viewing hole juxtaposed in visual alignment with the burner for visual confirmation of flame ignition, the viewing hole being of a predetermined size so as to preclude convection flow sufficient to cook food, whereby the food will cook by radiant heat only; and (e) spacing means for establishing and maintaining the vent space.

11. The barbecue grill of claim 10, wherein:

(a) the predetermined size of the fire grate viewing hole falls within a range of from approximately 1/8 inch (3 mm) across to approximately 1 inch (25 mm) across; and (b) the predetermined size of the fire grate vent space falls within a range of from approximately 1/8 inch (3 mm) across to approximately 1 inch (25 mm) across.

12. The barbecue grill of claim 10, wherein the spacing means further comprises a plurality of spacers interposed between the fire grate plate periphery and the grill housing.

13. The barbecue grill of claim 10, wherein the fire grate plate further comprises a flange extending generally around the plate periphery and projecting upward therefrom, so as to direct the flow of hot combustion gases upward along the housing wall inside surface.

14. The barbecue grill of claim 10, further comprising a divider wall attached to the fire grate plate lower surface and extending downward therefrom for dividing the plate into two heating zones, the divider wall extending from a first point closely adjacent to the plate periphery across the plate to a generally opposite second point closely adjacent to the plate periphery, for use with one burner of a dual burner grill, so as to confine hot combustion gases and radiant energy of the one burner to substantially one zone, and thereby conserve fuel.

15. The barbecue grill of claim 10, wherein the fire grate plate is generally circular in plan.

16. The barbecue grill of claim 10, wherein the fire grate plate is generally rectangular in plan.

17. A method of confirming flame ignition, vaporizing grease, and conserving fuel in a barbecue grill having a housing, a burner disposed within the housing, and a generally horizontal cooking grate disposed within the housing and above the burner, the housing having an upright housing periphery wall with an inside surface, the method comprising the steps of:

(a) interposing a fire grate plate between the burner and the cooking grate wherein grease from food will drip upon the fire grate;

(b) heating the plate with the burner, thereby vaporizing the grease from the plate;

(c) forming a plurality of alternating valleys and ridges in the plate;

(d) radiating heat sideways as well as upward from the valleys and ridges, thereby cooking the food thoroughly;

(e) viewing the flame through a viewing hole in the plate to confirm ignition;

(f) cooking the food by radiant heat only;

(g) limiting convection flow through the viewing hole in the plate to a flow insufficient to cook the food, whereby the food will be cooked by radiant heat only; and (h) limiting the viewing hole to a predetermined size small enough to limit convection flow through the plate.

18. The method of claim 17, further comprising the steps of:

(a) convecting hot combustion gases upward through a vent space between a peripheral edge of the plate and the housing wall inside surface;

(b) vaporizing the grease off the housing wall inside surface with the hot combustion gases; and (c) establishing and maintaining the vent space by interposing a plurality of spacers between the plate periphery and the housing wall inside surface.

19. The method of claim 18, further comprising the steps of:

(a) forming the peripheral edge of the plate upward into a flange; and (b) directing the hot combustion gases along the housing wall inside surface by the flange, thereby vaporizing the grease from the housing wall inside surface.

20. The method of claim 17, further comprising the steps of:

(a) dividing the plate into two opposite heating zones by attaching a divider wall to a lower surface of the plate;

(b) extending the divider wall from adjacent a peripheral first point on the plate across the plate to adjacent a generally opposite peripheral second point on the plate;

(c) heating one zone with one burner of a dual burner grill thereby conserving fuel; and (d) confining the hot combustion gases and radiant energy of the one burner to substantially one zone, by using the divider wall to substantially block heat flow to the opposite zone.

* * * * *